United States Patent
Borling (10) Patent No.: US 6,932,730 B2
(45) Date of Patent: Aug. 23, 2005

(54) VARIABLE SPEED DRIVE ASSEMBLY (75) Inventor: Al Borling, Columbia Station, OH (US)

(73) Assignee: MTD Products Inc., Valley City, OH (US)

(*) Notice: Subject to any disclaimer, the term of this patent is extended or adjusted under 35 U.S.C. 154(b) by 182 days.

(21) Appl. No.: 10/331,381

(22) Filed: Dec. 30, 2002

(65) Prior Publication Data

US 2004/0166976 A1 Aug. 26, 2004

(51) Int. Cl.[7] .................................................. F16H 7/14
(52) U.S. Cl. ........................................ 474/117; 474/101
(58) Field of Search ................................ 474/133, 117, 474/135, 138, 148, 89, 101; 56/11.3, 11.6

(56) References Cited

U.S. PATENT DOCUMENTS

| | | |
|---|---|---|
| 3,759,342 A | 9/1973 | Plamper |
| 3,777,585 A | 12/1973 | Plamper |
| 4,128,017 A | 12/1978 | Clarke |
| 4,132,121 A | 1/1979 | Clarke |
| 4,176,560 A | 12/1979 | Clarke |
| 4,285,419 A * | 8/1981 | Anderson .................... 56/11.3 |
| 4,301,902 A | 11/1981 | Gatsos et al. |
| 4,364,735 A | 12/1982 | Plamper et al. |
| 5,012,632 A * | 5/1991 | Kuhn et al. .................. 56/11.6 |
| 5,897,450 A | 4/1999 | May |
| 6,282,873 B1 * | 9/2001 | Wilken ........................ 56/11.3 |
| 6,364,794 B1 | 4/2002 | Plamper et al. |

OTHER PUBLICATIONS

Copy of the International Search Report (4 pages).

* cited by examiner

Primary Examiner—David A. Bucci
Assistant Examiner—Bradley J. Van Pelt
(74) Attorney, Agent, or Firm—Wegman, Hessler & Vanderburg (57) ABSTRACT A variable speed drive assembly with a double pulley, and a transmission input pulley. A first belt extending between a power source and a double pulley and a second belt extending between the double pulley and the transmission input pulley. A linkage assembly operating to move the double speed pulley toward the transmission input pulley to increase the vehicle speed. The drive assembly capable of disengaging or placed in a neutral condition when power to the vehicle is removed.

10 Claims, 6 Drawing Sheets

VARIABLE SPEED DRIVE ASSEMBLY

I. BACKGROUND OF THE INVENTION

A. Field of Invention

This invention pertains to the art of methods and apparatuses for variable speed drive assemblies, and more specifically to a variable speed drive assembly using a pair of pulley belt systems for use in a lawn tractor.

B. Description of the Related Art

It is known in the art to provide vehicles with drive assemblies that can vary the speed of the vehicle. For some vehicles, such as lawn tractors, it is known to use drive assemblies that include a pair of pulley belt systems. Such pulley belt systems generally work well for the intended purpose. However, these pulley belt systems require the use of one or more idler pulleys to create tension on the belts in the system. The use of these idler pulleys increases the amount of parts necessary and also increases the cost of pulley belt systems.

An attempt to reduce this problem can be found in U.S. Pat. No. 6,364,794 which describes a vehicle drive assembly having a variable speed drive assembly and a directional control transmission assembly operable between a forward and a reverse drive condition. The drive assembly includes a linkage assembly that operates to move a variable speed drive assembly toward a directional control transmission assembly to increase the speed of the vehicle. The prior art employs the use of springs rather than idler pulleys. One difficulty with this drive assembly is that the double pulley cannot be efficiently adjusted. Another difficulty is that a total of four springs are required to operate the drive assembly and to provide the proper tension on the belts and the proper movement of the variable speed drive assembly. Still another difficulty is that, once the ignition key is switched to the "off" position, the drive system belts cannot be easily disengaged to place the vehicle in a neutral drive condition. The prior art also requires a brake to disengage the belt.

The present invention provides methods and apparatuses for eliminating an idler pulley and using a minimum of springs to tension the system belts. The present invention eliminates two unnecessary springs used in the prior art and also provides methods of disengaging the system belts when there is no applied power to the drive assembly. The difficulties inherit in the art are therefore overcome in a way that is simple and efficient, while providing better and more advantageous results.

II. SUMMARY OF THE INVENTION

According to one aspect of the present invention, a new and improved variable speed drive assembly is provided which provides for the use of two springs to tension the system belts, eliminating an idler pulley.

Another advantageous this invention is efficient adjustment of a double pulley.

Another advantage is the ability to disengage, or put in the neutral position, the main drive belt while there is no applied power.

Yet another advantage is the ability to disengage the system belts without the use of a brake.

According to one aspect of the present invention, a drive mechanism comprises a transmission, a double pulley, a first belt system, a second belt system, and a linkage assembly.

According to another aspect of the invention, a first belt system is selectively operatively connecting a double pulley to a transmission input pulley.

According to another aspect of the invention, a second belt system selectively operatively connecting a double pulley to a source of power.

Still another aspect of the invention, a linkage assembly operatively connecting a first belt system and a second belt system to a frame, the linkage assembly comprising a first biasing means adapted to tension the second belt system.

According to another aspect of the invention, a linkage assembly further comprising a first bracket having a first, second, and third portion, and a second biasing means having first and seconds ends connected to a first portion of the first bracket.

Still another aspect of the invention, a second biasing means is adapted to tension the second belt.

Yet another aspect of the invention, a first bracket and a third bracket operatively pivot to provide movement of a double pulley toward a transmission input pulley.

Still other benefits and advantages of the invention will become apparent to those skilled in the art to which it pertains upon a reading and understanding of the following detailed specification.

IV. DESCRIPTION OF THE PREFERRED EMBODIMENT

The invention may take physical form in certain parts and arrangement of parts, one embodiment of which will be described in detail in this specification and illustrated in the accompanying drawings which form a part hereof and wherein.

Figure 1:
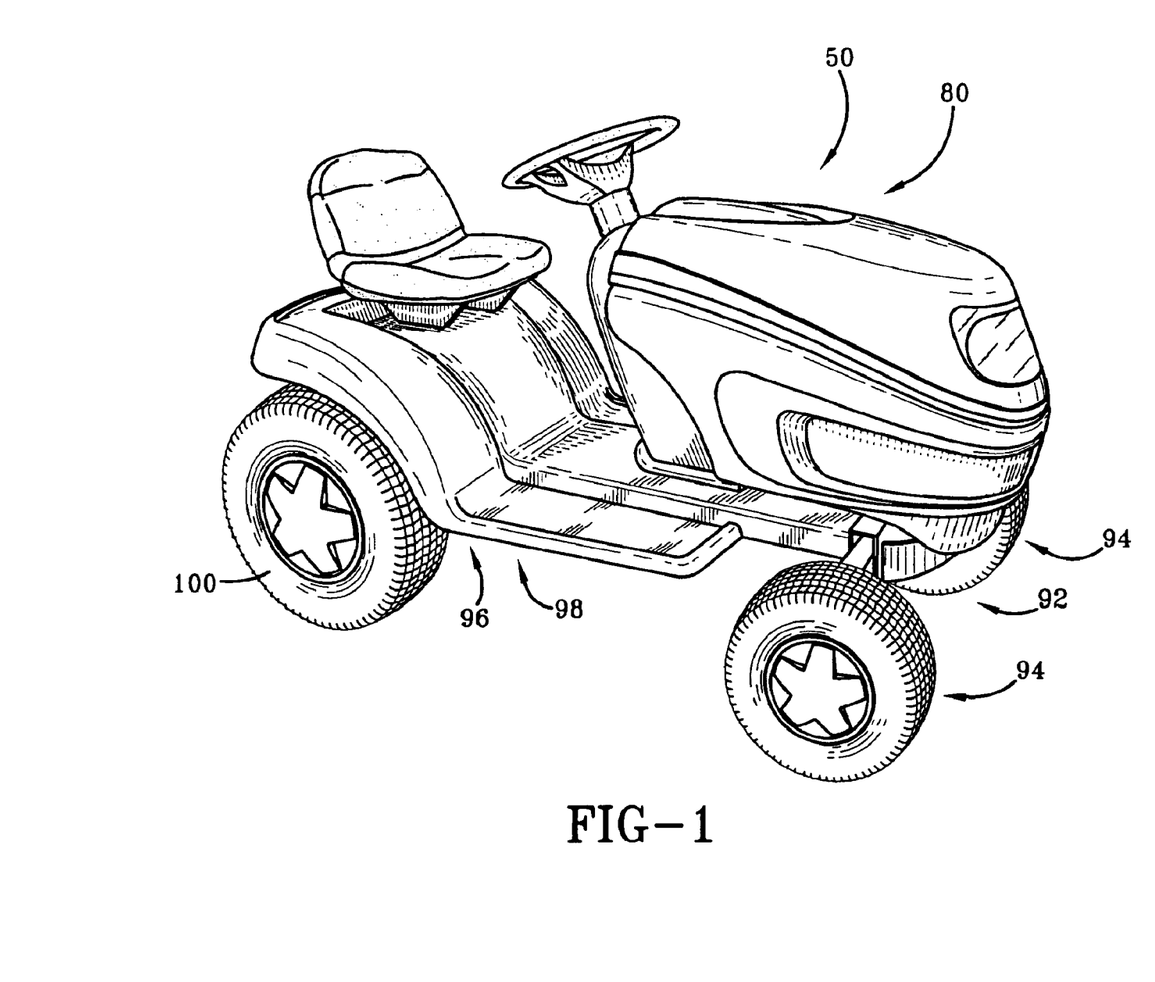
FIG. 1 is a side perspective view of a lawn tractor with a variable speed drive assembly in accordance with the present invention.
Figure 2:
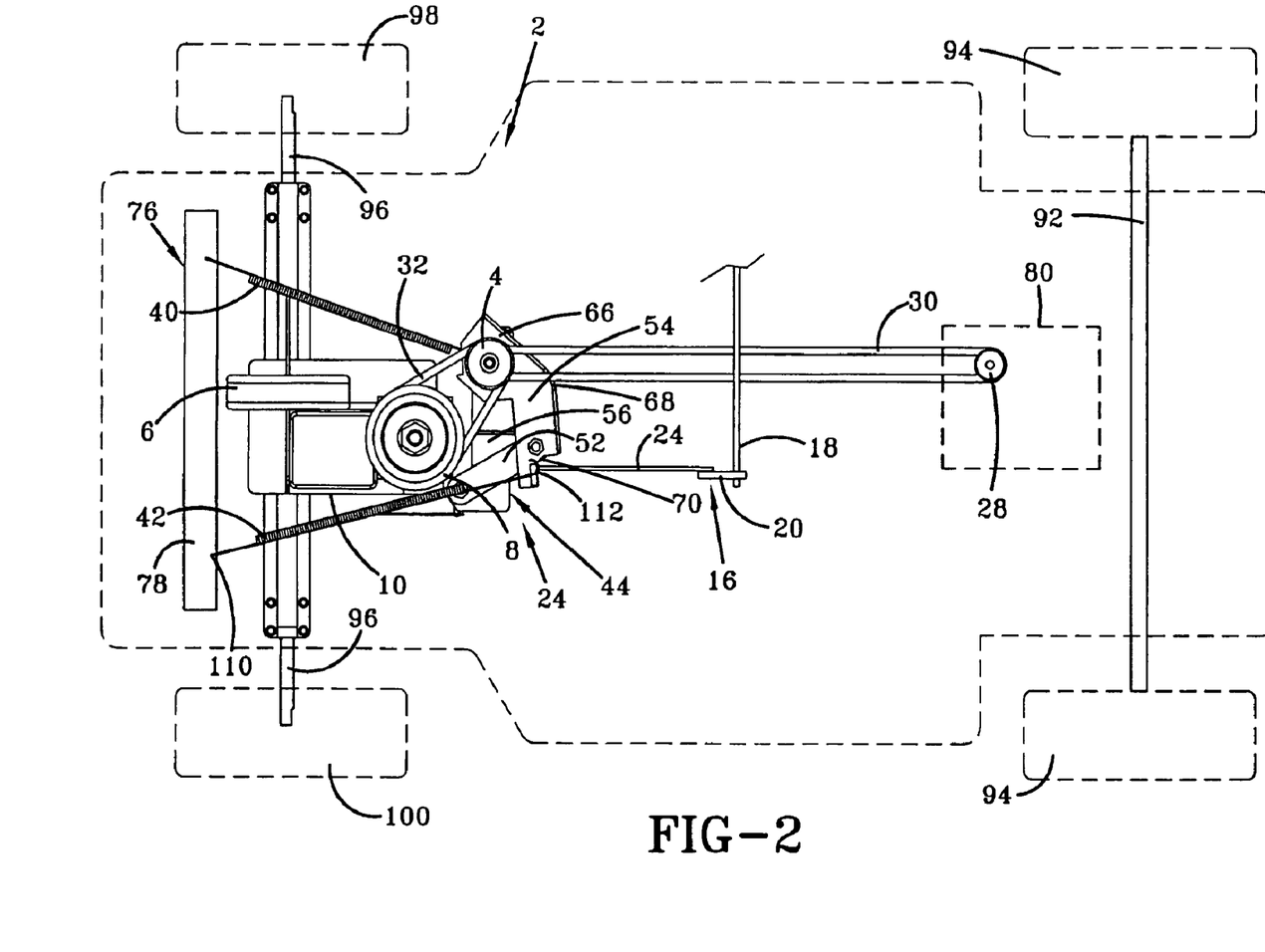
FIG. 2 is a schematic top view of the drive assembly.

Referring now to the drawings wherein the showings are for purposes of illustrating one embodiment of the invention only and not for purposes of limiting the same, FIG. 1 is a perspective view of a lawn and garden tractor 50. Referring also to FIG. 2, the tractor 50 preferably includes a frame 76, 78 and a power source or engine 80 supported by the frame. A left rear wheel 98 and a right rear wheel 100 are connected on opposite ends of a rear axle 96. The tractor 50 also has a pair of front steerable wheels 94 connected on opposite ends of a front axle 92. A variable speed drive assembly 2 provides power from the engine 80 to the rear axle 96. A differential 6 may be positioned between the left rear wheel 98 and the right rear wheel 100 in a matter well known in the art.

With continuing reference to FIG. 2, the variable speed drive assembly 2 consists of a transmission 10 having a transmission input pulley 8. The variable speed drive assembly 2 also includes a double pulley or variator 4 that transmits power from the engine 80 to the transmission input pulley 8. Power from the engine 80 is transmitted to the variator 4 via a first belt or drive belt 30. The variator 4 transmits power to the transmission input pulley 8 via a second belt or driven belt 32. The interaction of the drive belt and the driven belt provide power to drive the rear axle 96 and rear wheels 98, 100 of the vehicle 50. The transmission input pulley 8 is mounted to the transmission assembly shown generally at 10. The transmission 10 may be any type chosen with sound engineering judgment.

Figure 5:
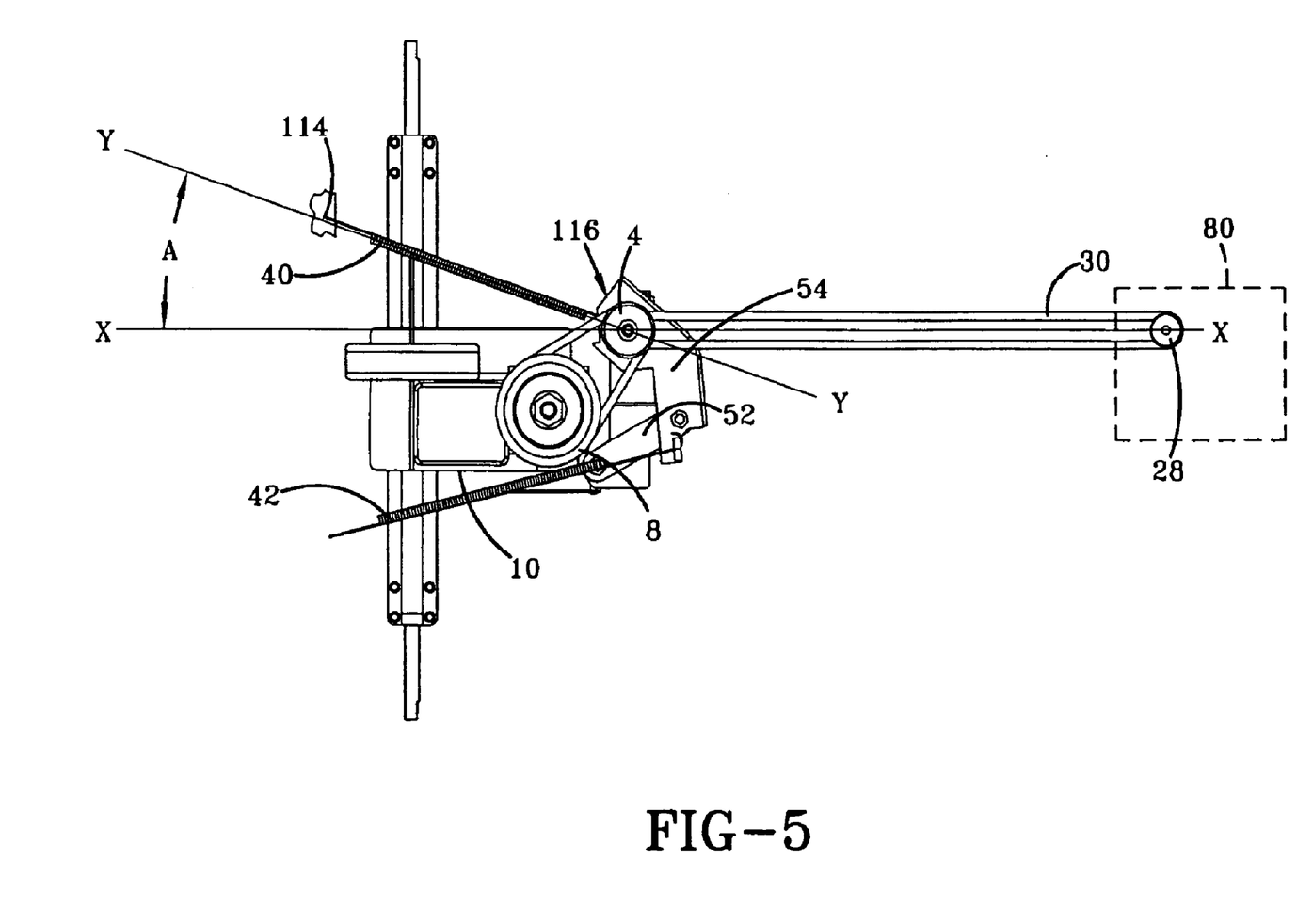
FIG. 5 is a partial view of the drive assembly showing angle.
Figure 6:
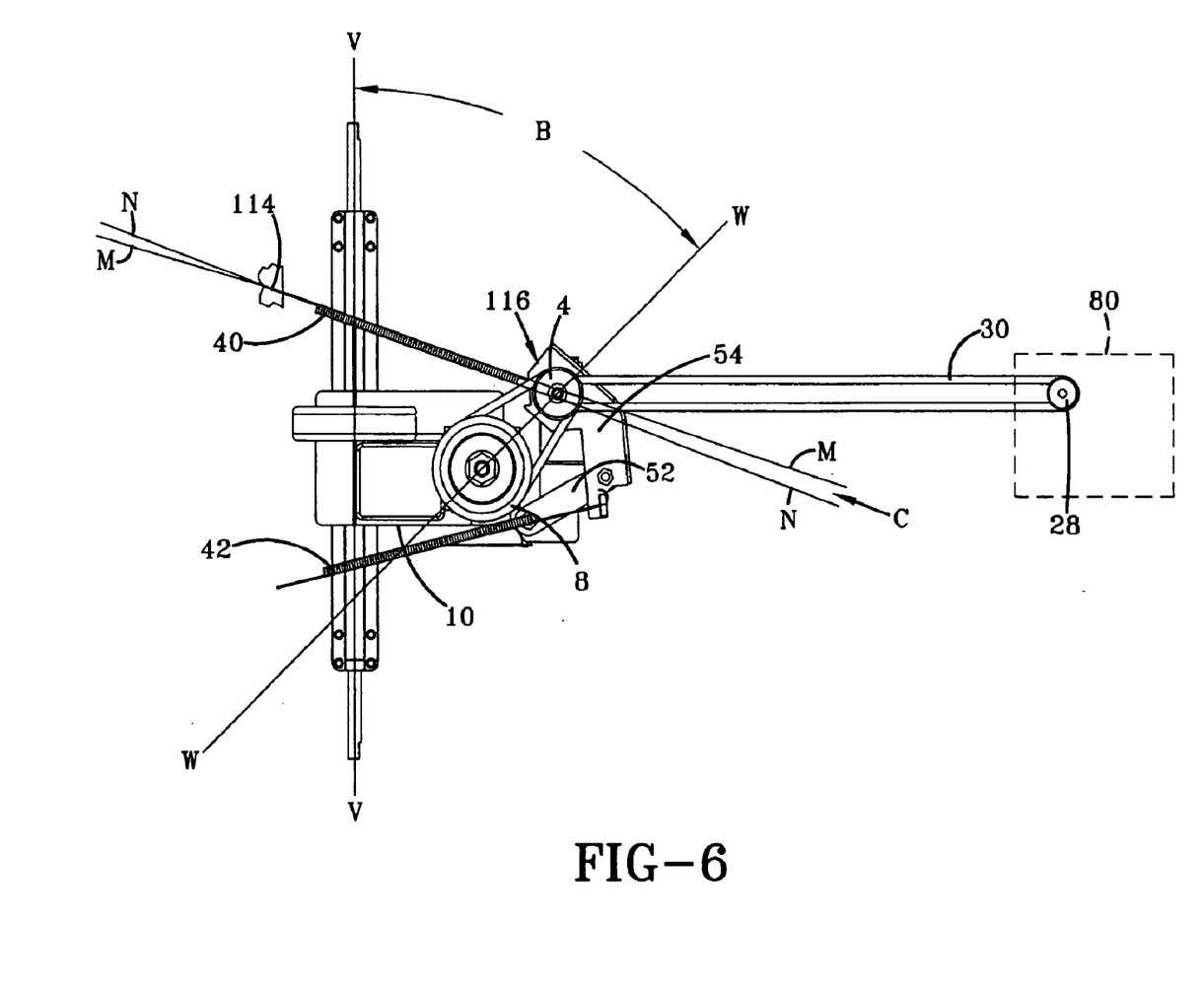
FIG. 6 is a partial view of the drive assembly showing angle B.

With reference now to FIGS. 2 and 5, the drive assembly 2 further comprises a linkage assembly 44 that operatively connects the drive belt 30 and the driven belt 32 to the vehicle frame 76, 78. The linkage assembly 44 has a first biasing means or spring 40 whose purpose is to tension the drive belt 30 regardless of the vehicle speed. The first spring 40 is connected at its first end 114 to the vehicle frame 76 and at its second end 116 to a spacer or other connection means 82. As shown in FIG. 6, angle C is defined as the angle between axis M—M and axis N—N. Axis M—M extends from the connection point of the first end 114 of the first spring 40 through the connection means 82 of the second end 116 and axis N—N extends from the connection point of the first end 114 of the first spring 40 through the center of the variator 4. Preferably, the attachment of the second end 116 is as close to the center of the variator 4 as possible using sound engineering judgment. It is also important to note that angle C will remain constant during movement of the variator 4 because the second end 116 will follow the path of the variator. As shown in FIG. 5, the drive belt 30 has a longitudinal axis X—X defined by the center of the drive pulley 28 and the center of the variator 4. The first spring 40 has a longitudinal axis Y—Y. Angle A is the angle between these two axes and preferably is between 0 degrees and 50 degrees. Angle A is most preferably between 0 degrees and 35 degrees. If angle A exceeds 50 degrees, adjustment of the variator 4 becomes inefficient. Thus, the first spring 40 is essentially assigned to the drive belt 30 and to control the tension on the drive belt 30.

With continuing reference to FIGS. 2 and 5, the first end 114 of the first spring 40 may extend through a hole in the vehicle frame 76. There may be a connection point on the frame on which the first spring 40 is connected or attached. This connection point may be any means chosen with sound engineering judgment. The primary spring 40 may be connected at its second end 116 to a shoulder spacer or another connector means 82, shown in FIG. 4, that is mounted to a bearing housing 86 and a bearing bolt 84. The primary spring 40 may be connected or hooked or attached at that connector means 82. This may be accomplished by providing a hook or latch on each end of the first spring 40. This hook may connect or latch or engage around the connection point and connector means 82.

With continuing reference to FIG. 2, the linkage assembly also has a second biasing means, or spring, 42. The second spring 42 keeps constant tension on the driven belt 32 as the variator 4 moves through high speed and low speed ranges. The second spring 42 is connected at its first portion 110 to the vehicle frame 78. The second spring 42 is connected at its second portion 112 to an arm 54 of the linkage assembly. The operation of this will be discussed in more detail below. This may be accomplished by providing a hook or latch on each end of the second spring 42.

With continuing reference to FIG. 2, the variable speed drive assembly 2 further consists of a linkage assembly 44 that has a first arm or bracket 52. The first arm 52 may have a first portion 60 and a second portion 62. The first portion 60 may be connected to a second bracket or arm or torque strap 56 by a bolt, screw, or any connecting means 130 chosen with sound engineering judgment. The connecting means 130 preferably forms a first pivot point 34, shown in FIG. 4, which may consist of an opening to which a shoulder bolt, or other connector is attached. The first arm 52 may pivot at this first pivot point 34.

Figure 4:
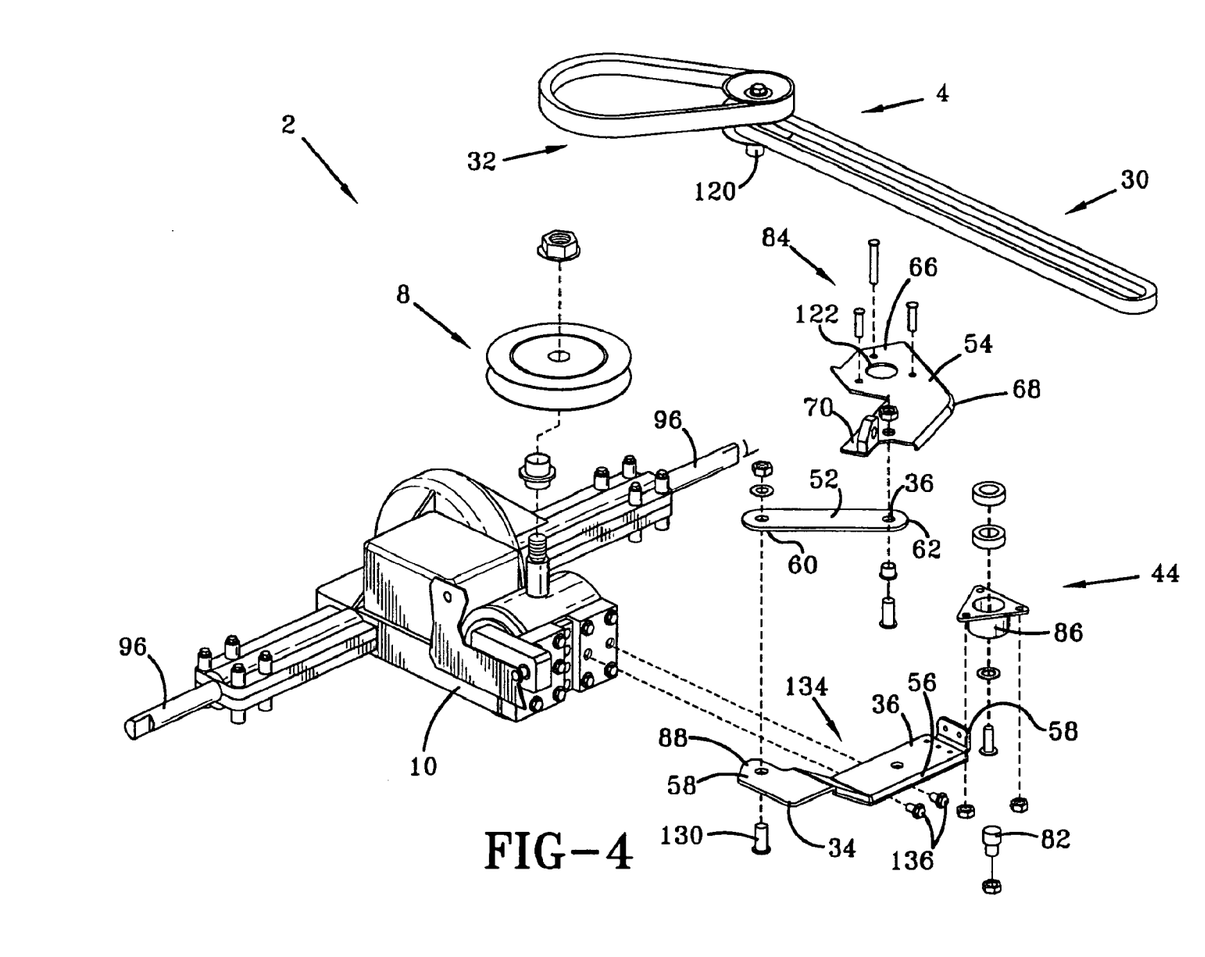
FIG. 4 is a side view of the drive assembly partially disassembled.

With reference to FIG. 4, a flange or bracket or connection mechanism 58 is located at each end of the torque strap 56. The connection mechanism 58 anchors the torque strap 56 to the vehicle frame 76, 78. This connection mechanism 58 allows the torque strap 56 to absorb the reactionary force of the transmission 10 into the vehicle frame 76, 78. There are two openings, holes or slots 134 on the transmission portion 88 of the torque strap 56 through which bolts, or screws or other connector means 136 anchor or mount the torque strap 56 to the transmission 10. The configuration of the transmission portion 88 may provide a landing pad, or launching pad on which other components may be mounted or attached, if required.

With reference to FIG. 2, the linkage assembly 44 further consists of the third bracket or arm 54 that may have a first segment 66, a middle segment 68, and a third segment 70. The middle segment 68 connects with the second portion 62 of the first arm 52. The third arm 54 is connected at its first segment 66 to a protruding shaft 120 of a variator 4. The third segment 70 of the third arm 54 is connected to the second spring 42. The brackets 52, 54, 56 may be steel, metal, aluminum or any type of material chosen with sound engineering judgment In one embodiment, the variator 4 may have bearings mounted on the outside, this is best seen in FIG. 4. On the rear or underside of the double pulley 4 is a protruding shaft 120. This protruding shaft 120 extends through an opening 122 on the third arm 54 and into the bearing housing 86. Projecting through the center of the shaft 120 and bearing housing 86 is the spacer 82 and the bearing bolt 84. These bearings mount into the bearing housing 86.

With continued reference to FIG. 4, the linkage assembly 44 also may include a second pivot point 36 to which the second portion 62 of the first arm 52 and a third bracket or arm 54 is connected. This pivot point 36 may be a hole or slot or slit through which a bolt or screw or another type of connection means is attached and which attaches the first arm 52 and third arm 54 together. The first arm 52 and the third arm 54 may pivot in opposite directions around this second pivot point 36.

With further reference to FIG. 4, the linkage assembly 44 may pivot at the two pivot points 34, 36 and is free to move in any direction and to any extent of movement. This movement may be moved or controlled to go into specific places by the primary spring 40 and the secondary spring 42. As the second spring 42 tensions or compresses it may pull on the third portion 70 of the third arm 54. As the third portion 70 moves toward the transmission input pulley 8, it causes a pivoting action at the first pivot point. This pivot action causes the first arm 52 to move in the opposite direction of the third arm 54. This action pulls or rotates the variator 4 away from the transmission input pulley 8 thereby creating tension on the driven belt 32. As the variator 4 moves away from the transmission input pulley 8 the vehicle speed decreases because the tension on the drive belt 30 has been reduced. This reduction in tension of the drive belt 30 provides less energy transfer between the engine 80 and the variator 4. This in turn reduces the energy transmitted from the variator 4 to the transmission input pulley 8 and the force going to the rear axle 96.

Referring now to FIG. 2, at an area accessible to the operator there may be a speed selector 18, a plate 20, and a series of notches 16. Each notch 16 corresponds to a different vehicle speed range. In one embodiment there may be eight different speeds ranges varying from a relatively slow speed to a relatively fast speed. Another embodiment may provide more than eight speed ranges. Yet another embodiment may provide less than eight speed ranges. The speed selector 18 is connected to a link 24. The link is operatively connected to a first arm 52 and a third arm 54. The third arm 54 may pivot about pivot point 36 to move the position of the variator 4 relative to the transmission input pulley 8. This movement of the third arm 54 at the pivot point 36 may operate to pivot the first arm 52 around pivot point 34. The particular way in which link 24 is connected to the third arm 54 can be any way chosen with sound engineering judgment.

Figure 3:
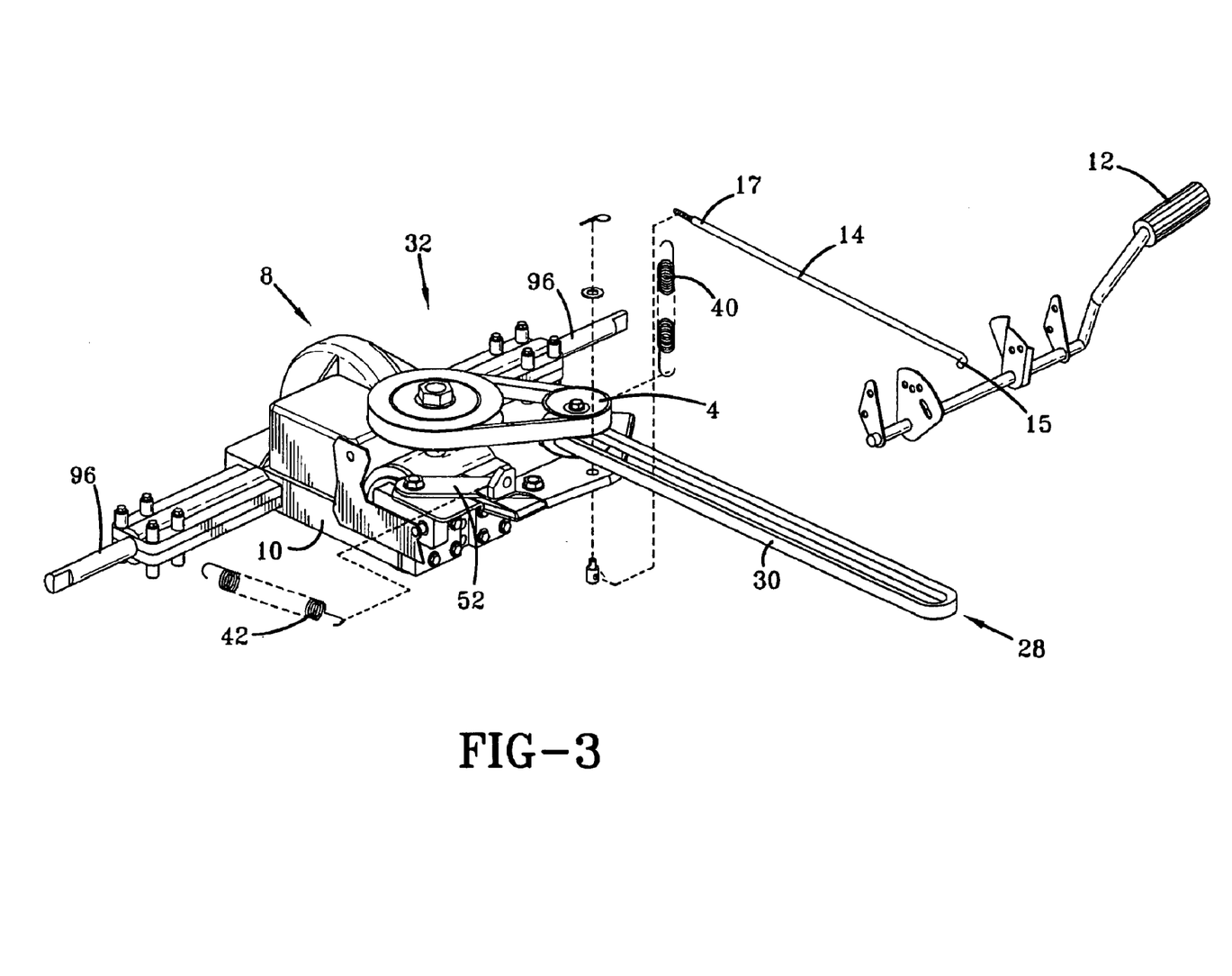
FIG. 3 is an end perspective view of the drive assembly.

With reference to FIG. 3, a foot clutch pedal 12 is connected to a link 14. This link 14 is attached at one end 15 to the foot clutch pedal 12 and is attached at its second end 17 to the third arm 54. The link 14 is connected to the third arm 54 via a bolt or other type of connection means chosen with sound engineering judgment. When the clutch pedal 12 is depressed, the second end 17 of the link arm 14 pulls or rotates the middle segment 68 of the third arm 54 in the direction of the drive pulley 28. The third arm 54 pivots at the second pivot point 36. This causes the variator 4 to move toward the drive pulley 28. As the third arm is pivoting and moving in the direction of the drive pulley 28, it may cause the first arm 52 to pivot at the first pivot point 34. The movement of the first arm 52 may further cause the variator 4 to move toward the drive pulley 28.

With reference now to FIGS. 2 and 3, the operator may wish to select different vehicle speeds. The operator changes the vehicle speed by transferring or inserting the speed selector 18 into a different notch 16. When the pressure is relieved off the variator 4, the operator is able to select the speed of the vehicle by moving the speed selector 18 into a different notch 16. If the operator attempts to move the speed selector 18 without relieving the pressure on the variator 4 it will be very difficult to move the speed selector 18. Once the operator engages the speed selector 18 into a notch 16, the speed selector 18 will remain engaged or trapped in that notch 16. The vehicle may only go as fast as the speed range selected, this is a form of speed limiting. As the speed selector 18 engages the notch 16 on the plate 20, the variator 4 will ultimately end up traveling in an arc that is somewhat controlled by tension from the length of the driven belt 32. The movement of the speed selector 18 will cause the variable speed drive assembly 2 to go to a certain position. The variable speed drive assembly 2 will balance or equalize at that point in time, causing the vehicle 50 to go a different speed than it was going before. The vehicle speed will be limited to this range and will not be able to go faster without moving the speed selector 18 to a different notch 16 that corresponds to a faster speed. The same is true if the operator wishes to decrease the speed of the vehicle. There are times when the vehicle speed will fluctuate, such as going up or down a hill, however, once the vehicle is level, the speed will return to the operator selected speed.

With reference now to FIG. 6, rear axle 96 has a longitudinal axis V—V. The relationship between the center of variator 4 and the center of the transmission input pulley 8 is longitudinal axis W—W. Angle B is the angle between these two axes and preferably is between 0 degrees and 80 degrees. Most preferably Angle B is between 0 degrees and 50 degrees. As Angle B approaches 90 degrees the less the drive assembly 2 may be able to provide the proper disengagement desired. As Angle B approaches 0 degrees, the more the drive assembly 2 disengagement performance is improved.

In is commonly known in the art that at times the operator may shut off the vehicle without depressing the foot clutch petal 12. In some situations the operator may park the vehicle and just turn the key to the "off" position. This shuts the vehicle off with the drive assembly 2 still in the speed range selected. If this happens, the present invention has the ability to easily disengage the unit, taking the vehicle out of drive and putting the drive assembly in a neutral condition. With reference to FIG. 4, the pivot points 34, 36 of the linkage assembly 40 are able to pivot the arms 52, 54 in either direction so no matter what speed the unit is shut off in, the variator 4 is pivoted around the center of the transmission input pulley 8, thereby moving the variator 4 towards the drive pulley 28. The drive belt 30 would then disengage because the tension on the drive belt 30 is relieved once the variator 4 moves away from the transmission input pulley 8. In this way the operator only needs to depress the foot clutch pedal 12 to disengage, or place in a neutral condition, the drive assembly 2 while the key is in the "off" position. This also eliminates the need for an additional compression spring that is required in the prior art.

One embodiment has been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

I claim:

1. A vehicle drive mechanism for providing a plurality of driving speeds for a vehicle, the drive mechanism comprising:
   a power source having a drive pulley:
   a transmission having an input pulley;
   a double pulley;
   a first drive belt operatively connecting said double pulley to the drive pulley of the power source;
   a second driven belt operatively connecting said double pulley to said transmission input pulley;
   a linkage assembly operatively connecting said double pulley to an associated frame of the vehicle such that said double pulley is movable in relation to the drive pulley to control the tension of said first belt, said linkage assembly comprising:
   a first linkage arm;
   a second linkage bracket, said bracket mounted on a frame of the vehicle;
   a third linkage arm having first and second ends, said double pulley being operatively connected to said third arm at said first end;
   a first spring operatively connected to the double pulley such that said first spring acts near the axis of rotation of the double pulley, said first spring adapted to tension said first belt, the first spring being positioned at an angle (A), where the first belt has a longitudinal axis (X—X) and the first spring has a longitudinal axis (Y—Y), where the angle (A) is an angle between said two axes and is between 0–50 degrees;
   a second spring operatively connected to said third arm at said second end thereof; and
   a speed selector operatively connected to said linkage assembly, said speed selector being positionable in a plurality of selectable positions corresponding to a plurality of desired vehicle speeds;
   wherein said first and third arms and said bracket interconnect such that said first arm is pivotally connected to said second bracket at a first pivot point, said first arm is pivotally connected to said third arm at a second pivot point, and wherein said first arm and said third arm pivot about said first and second pivot points to position the double pulley along a generally arcuate path about the transmission input pulley thereby varying the distance between the double pulley and the drive pulley, and wherein the speed selector selectively positions said linkage assembly to thereby control the position of the double pulley and provide a plurality of selectable speeds.

2. The drive mechanism of claim 1 wherein said second spring is adapted to tension said second belt.

3. The drive mechanism of claim 2 wherein said transmission is operatively connected to a rear axle, said rear axle having a longitudinal axis (V—V) and said second belt system having a longitudinal axis (W—W) wherein an angle (B) is defined as the angle between said longitudinal axis (V—V) and said longitudinal axis (W—W) and is between 0–80 degrees.

4. The drive mechanism of claim 1 wherein the double pulley has a protruding shaft and the third arm is connected to said protruding shaft of the double pulley.

5. The drive mechanism of claim 4, wherein the first spring is connected to said protruding shaft of the double pulley.

6. A lawn tractor comprising:
   a frame;
   at least a first ground engaging wheel operatively connected to said frame;
   an engine supported by said frame and operatively connected to a drive pulley;
   a drive mechanism for providing a plurality of driving speeds for the tractor, the drive mechanism comprising:
   a transmission having an input pulley;
   a double pulley;
   a first drive belt operatively connecting said double pulley to the drive pulley of the engine;
   a second driven belt operatively connecting said double pulley to said transmission input pulley;
   a linkage assembly operatively connecting said double pulley to the frame of the tractor such that said double pulley is movable in relation to the drive pulley to control the tension of said first belt, said linkage assembly comprising:
   a first linkage arm;
   a second linkage bracket, said bracket mounted on a frame of the vehicle;
   a third linkage arm having first and second ends, said double pulley being operatively connected to said third arm at said first end;
   a first spring operatively connected to said double pulley such that said first spring acts near the axis of rotation of the double pulley, said first spring adapted to tension said first belt, the first spring being positioned at an angle (A), where the first belt has a longitudinal axis (X—X) and the first spring has a longitudinal axis (Y—Y), where the angle (A) is an angle between said two axes and is between 0–50 degrees;
   a second spring operatively connected to said third arm at said second end thereof: and
   a speed selector operatively connected to said linkage assembly, said speed selector being positionable in a plurality of selectable positions corresponding to a plurality of desired vehicle speeds;
   wherein said first and third arms and said bracket interconnect such that said first arm is pivotally connected to said second bracket at a first pivot point, said first arm is pivotally connected to said third arm at a second pivot point, and wherein said first arm and said third arm pivot about said first and second pivot points to position the double pulley along a generally arcuate path about the transmission input pulley thereby varying the distance between the double pulley and the drive pulley, and wherein the speed selector selectively positions said linkage assembly to thereby control the position of the double pulley and provide a plurality of selectable speeds.

7. The lawn tractor of claim 6 wherein said second spring is adapted to tension said second belt.

8. The lawn tractor of claim 7 wherein said transmission is operatively connected to a rear axle, said rear axle having a longitudinal axis (V—V) and said second belt system having a longitudinal axis (W—W) wherein an angle (B) is defined as the angle between said longitudinal axis (V—V) and said longitudinal axis (W—W) and is between 0–80 degrees.

9. The lawn tractor of claim 6 wherein the double pulley has a protruding shaft and the third arm is connected to said protruding shaft of the double pulley.

10. The lawn tractor of claim 9 wherein the first spring is connected to said protruding shaft of the double pulley.

* * * * *